No. 825,856. PATENTED JULY 10, 1906.
D. B. MILLS.
SPARK PLUG.
APPLICATION FILED OCT. 4, 1904.
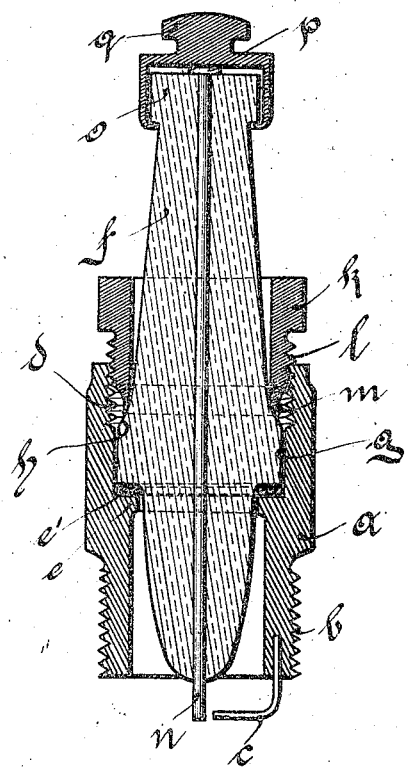
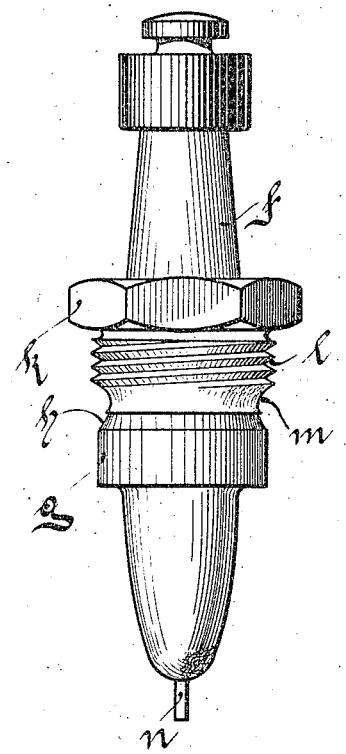
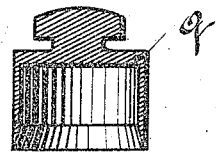
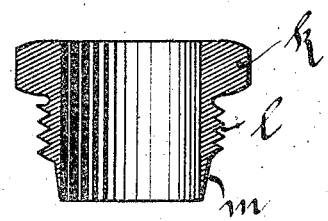
Witnesses
S. J. Bergman
Beatrice Murie
Inventor
David B. Mills.
By his Attorney

UNITED STATES PATENT OFFICE.

DAVID B. MILLS, OF EAST ORANGE, NEW JERSEY.

SPARK-PLUG.

No. 825,856.

Specification of Letters Patent.

Patented July 10, 1906.

Application filed October 4, 1904. Serial No. 227,125.

*To all whom it may concern:*

Be it known that I, DAVID B. MILLS, a citizen of the United States, residing at 225 Midland avenue, East Orange, New Jersey, have invented certain new and useful Improvements in Spark-Plugs, of which the following is a clear, full, and exact description.

My invention relates to a spark-plug; and my object is to improve and simplify the construction of the same.

My invention will be set forth in the claims.

In the preferred embodiment of my invention shown in the drawings, Figure 1 is a central vertical section. Fig. 2 is a side elevation of the shank, bushing, and cap. Fig. 3 is an enlarged view of the cap before being upset, and Fig. 4 is an enlarged section of the bushing before being upset.

It has been found that where an earthenware shank—such, for example, as porcelain—is used with an unyielding bushing screwing down upon a collar on the same there has been great danger of cracking the shank, because the pressure when the bushing was screwed down too tight or the expansion of the shank when heated would cause the porcelain to crack even when a packing material is used. The embodiment of my invention illustrated avoids both these objections and also avoids the necessity of providing a gasket between the bushing and the collar of the shank.

$a$ is a short tubular shell which I call a "socket," and this may be provided with external screw-threads $b$ and a sparking terminal $c$, if desired. It is also provided with screw-threads $d$, which are preferably internal, as shown, and an internal shoulder $e$, which when threads $d$ are internal projects beyond—that is, inward—from those threads.

$f$ is a round shank, preferably made of porcelain or other refractory insulating material, having thereon an enlargement $g$, which rests upon shoulder $e$, where a ring or gasket $e'$ of soft material may be interposed, if desired, to form a tight joint, the gasket in this case acting as a part of the shoulder which supports the shank. The shank has a portion $h$ tapering upward—that is, away from the enlargement. $k$ is a threaded bushing surrounding the tapered portion of the shank and screwing upon the socket, preferably by external threads $l$ thereon, so that the lower edge $m$ presses against said tapered portion of the shank.

The bushing is preferably formed of soft brass, and I prefer to sharpen or bevel the edge of the same, as seen in Fig. 4, so that when the bushing is screwed down this edge—that is, the portion which contacts with the shank—will be upset and will turn outward, as seen in Figs. 1 and 2. In this way a close fit will result, and even if the bushing is screwed down too tightly the porcelain will not be cracked, as the bushing will yield and upset further. Substantially the same result will occur if the shank expands under the heat of combustion. The shank is, furthermore, thicker above the enlargement, and therefore stronger than would be the case if the sides of the shank above the enlargement were parallel.

The shank has a head $o$ at its upper end. $n$ is a sparking terminal, preferably in the form of a wire located in a hole longitudinally through the shank and, if desired, may have a lateral extension $p$, preferably in the form of an upset end, so that it will not pull down through the hole. $q$ is a brass cup-shaped cap passed over said head and has its lower edge upset underneath the head $o$, so that the bottom of the cap rests upon and firmly presses said upset end $p$ of conductor $n$ down on the head $o$ of said shank. Thus the cap may be fixed in place without the use of cement or solder and produces a good electrical connection between the cap and terminal $n$. The lower edge of the cap is preferably beveled from the outside toward the inside, as shown in Fig. 3, which is an advantage where the edge is upset in a die.

The cap $q$ and terminal are not claimed specifically in this application, as they are described and claimed in a copending application, Serial No. 302,333, filed February 23, 1906.

It will be observed that the collar formed by the tapered lower end $m$ of the bushing, together with the screw-threads upon the bushing and upon the socket, comprises one form of a sealing means for sealing the plug from the escape of gas, the two threads being of sufficient length to force the lower edge of the collar against the tapered portion $h$, which in the embodiment shown in the drawings is upon the shank, and so upset the collar.

I am aware that other forms of my invention than that illustrated may be made without departing from the scope of my invention as claimed, and I therefore do not wish to be limited to the particular embodiment heretofore described and illustrated.

What I claim is—

1. In a spark-plug in combination, a socket having a screw-thread and a shoulder, a shank of insulating material having thereon an enlargement adapted to rest on said shoulder and tapering upward from said enlargement and a threaded bushing surrounding said tapered portion and screwing upon said socket to press the bushing against the tapered portion, the bushing where it presses upon said tapered portion being formed of soft metal whereby it is adapted to be upset by said pressing upon said tapered portion, said bushing being of a sufficient length to cause such soft-metal portion to be upset.

2. In a spark-plug in combination, a socket having a screw-thread and a shoulder, a shank of insulating material having thereon an enlargement adapted to rest on said shoulder and tapering upward from said enlargement, and a threaded bushing surrounding said tapered portion and screwing upon said socket and adapted to press against said tapered portion, the lower edge of said bushing being formed of soft metal and adapted to be upset when screwed down upon said tapered portion.

3. In a spark-plug in combination, a socket having a screw-thread and a shoulder, a shank of insulating material having thereon an enlargement adapted to rest on said shoulder and tapering upward from said enlargement, and a threaded bushing surrounding said tapered portion and screwing upon said socket and adapted to press against said tapered portion, the lower edge of said bushing being sharpened and formed of soft metal and adapted to be upset when screwed down upon said tapered portion.

4. In a spark-plug in combination, a socket having an internal screw-thread and an internal shoulder projecting beyond said threads, a shank of insulating material having thereon an enlargement adapted to rest on said shoulder and tapering upward from said enlargement, and an externally-threaded bushing surrounding said tapered portion and screwing into said socket and adapted to press against said tapered portion, the lower edge of said bushing being formed of brass and adapted to be upset when screwed down upon said tapered portion, a sparking terminal at the lower end of said shank, a terminal at the upper end, and a conductor running through said shank.

5. In a spark-plug in combination, a socket having a screw-thread and a shoulder, a shank of insulating material having thereon an enlargement adapted to rest on said shoulder and tapering upward from said enlargement, and a threaded bushing surrounding said tapered portion and screwing upon said socket and adapted to press against said tapered portion, the lower edge of said bushing being formed of soft metal upset outward from said tapered portion.

6. In a spark-plug in combination, a socket having a screw-thread and a shoulder, a shank of insulating material having thereon an enlargement adapted to rest on said shoulder and tapering upward from said enlargement, and a threaded bushing surrounding said tapered portion and screwing upon said socket and adapted to press against said tapered portion, the lower portion of said bushing below the threads thereon being smaller in diameter than said threads and formed of soft metal and adapted to be upset when screwed down upon said tapered portion.

Signed at New York, N. Y., this 30th day of September, 1904.

DAVID B. MILLS.

Witnesses:
EMERSON R. NEWELL,
BEATRICE MIRVIS.